June 10, 1930.  V. W. CODDINGTON  1,763,342
TRUCK BODY
Filed Sept. 15, 1924    2 Sheets-Sheet 2
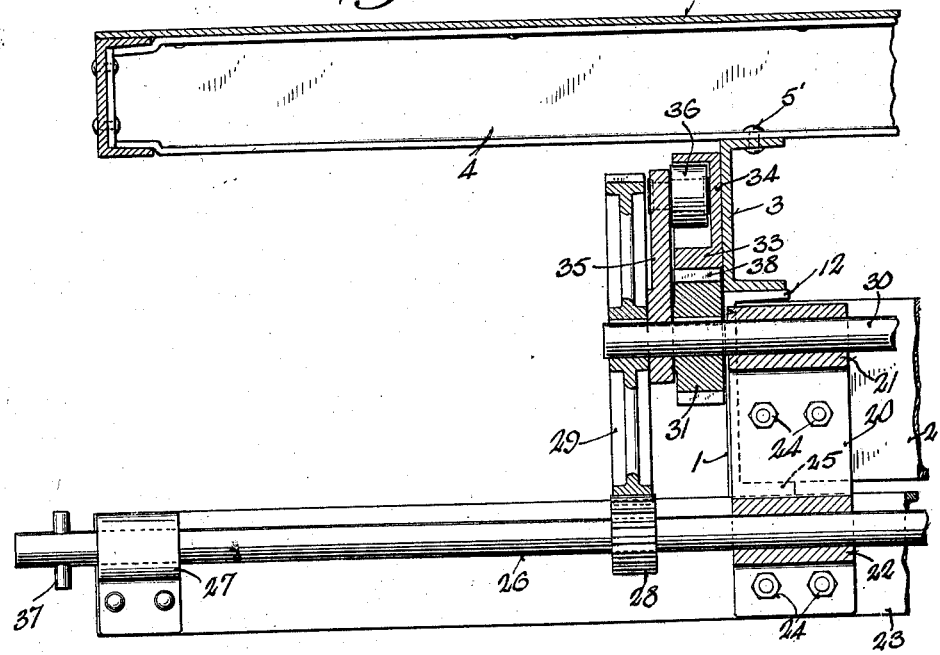
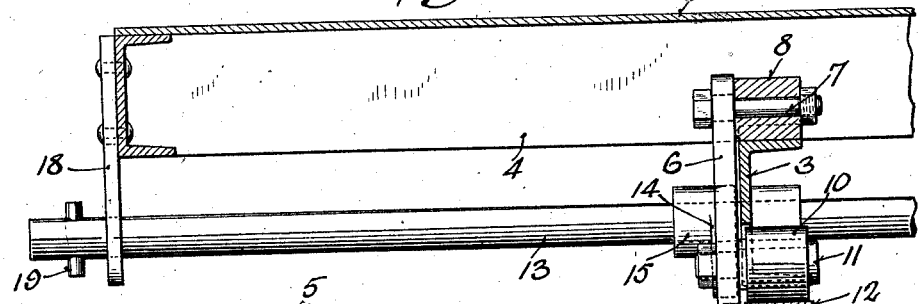
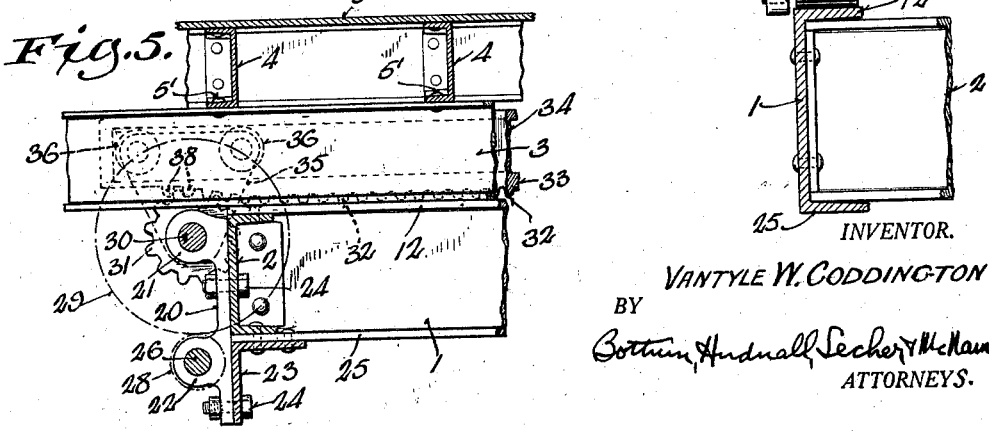
INVENTOR.
VANTYLE W. CODDINGTON
BY
ATTORNEYS.

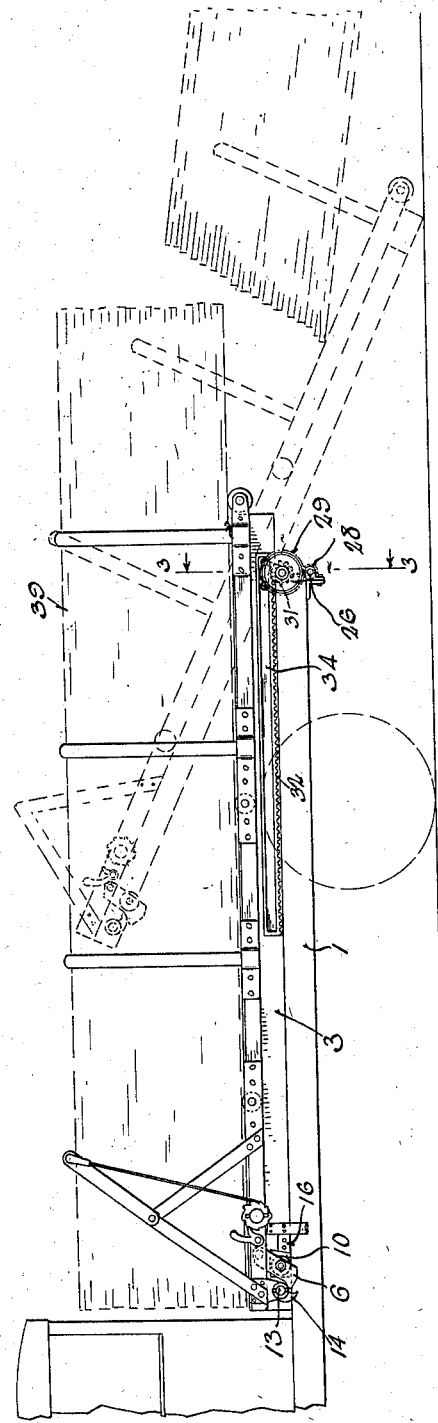

Patented June 10, 1930

1,763,342

UNITED STATES PATENT OFFICE

VANTYLE W. CODDINGTON, OF NORTH MILWAUKEE, WISCONSIN, ASSIGNOR TO LAKESIDE BRIDGE & STEEL CO., OF NORTH MILWAUKEE, WISCONSIN, A CORPORATION OF WISCONSIN

TRUCK BODY

Application filed September 15, 1924. Serial No. 737,678.

This invention relates to improvements in truck bodies and more particularly to the connections between the truck body and chassis of the vehicle for effecting movement of the body with respect to the chassis.

An object of the invention is to provide a truck body with improved means for connecting the body to the chassis of a vehicle for movement with respect thereto.

Another object is to provide an improved truck body having means for lifting the body from the chassis of a vehicle and then moving it with respect thereto to tilt the body and dump the load therefrom.

Another object is to provide a truck body with improved means for holding it in operative engagement with the chassis of a vehicle when the body tilts to dump the load therefrom.

Other objects and advantages will hereinafter appear.

For the purpose of illustrating the invention, an embodiment thereof is shown in the drawings, in which Figure 1 is a side elevation showing the manner in which the truck body is moved with respect to the chassis of a vehicle to dump the load;

Fig. 2 is a side elevation showing the connections between the truck body and chassis for lifting the body from the chassis and then moving it backwardly with respect thereto;

Fig. 3 is an enlarged section on line 3—3 of Fig. 1;

Fig. 4 is a section on line 4—4 of Fig. 2; and

Fig. 5 is a side elevation looking toward the left in Fig. 3.

The frame of the vehicle chassis may comprise channel side members 1 and channel end members 2.

The frame of the truck body may be similarly constructed from channel members and comprise side members 3 and suitable end members, not shown. Channel members 4 may be arranged transversely to side members 3 and secured thereto by any suitable means such as rivets 5', the members 4 being sufficient in number and properly spaced to support the plate 5 which forms the floor of the truck body.

When the truck body is in position upon the chassis to carry a load, side members 3 of the body rest upon and are supported by side members 1 of the chassis, as shown in Figs. 1, 3 and 5. When the load is to be dumped, the truck body is lifted from engagement with the vehicle frame and then moved backwardly upon the chassis until the body tilts, as shown in dotted lines in Fig. 1, to dump the load. When the load has been dumped, the truck body is moved forwardly upon the chassis to its normal position with respect thereto, as shown in full lines in Fig. 1, and the body lowered again so that side members 3 thereof rest upon and are supported by side members 1 of the chassis frame.

The truck body is thereby directly supported by the chassis frame in transporting a load and the connections for moving the truck body backwardly relieved from any strain except that which occurs when a load is being dumped. The connections for lifting the body from the chassis in this manner and moving it backwardly with respect thereto in dumping the load will now be described.

An arm 6 is pivotally supported at the forward end of each side member 3 of the truck body by any suitable means such as a bolt 7 passing through the arm and a suitable bearing 8 secured to the top flange of member 3 by bolts 9 or other suitable means. The web of side member 3 is cut away as shown in Fig. 4 to receive a roller 10 pivotally mounted at the free end of arm 6 by any suitable means such as a bolt 11, the roller being arranged to engage and roll upon the upper flange 12 of side member 1 of the chassis. A shaft 13 is journaled in side members 3 of the truck body and arranged transversely with respect thereto. A cam 14 provided with a boss 15 is fixed to shaft 13 for rotation therewith, the cam being arranged to engage the free end of arm 6 and swing the same backwardly against a stop or plate 16 secured in any suitable way to the web of member 3. An arm similar to arm 6 is supported in like manner by the opposite side member 3 and a cam similar to cam 13 fixed to shaft 12 for engagement therewith. When cams 14 are rotated to the position shown in Fig. 2, arms 6 are swung backwardly against stops 16 to effect engagement of rollers 10 with the upper flanges 12 of members 1 of the chassis to lift the front end of the truck body from the chassis. The front end of the truck body is thereby supported at each side by a roller 10 and the weight evenly distributed between the rollers. Each cam 14 may be so formed that when the cam is in the position shown in Fig. 2 to hold the truck body from the chassis, the normal to the surface of the cam at the point of contact therewith of arm 6 will pass below the center of rotation of shaft 13. Each cam will therefore have a tendency to rotate in a clockwise direction, as viewed in Fig. 2, and will be held in tight engagement with the extended portion 17 of arm 6 to prevent forward movement of roller 10 when the truck body is moved backwardly along the chassis, as hereinafter explained.

The portion 17 of each arm 6 is shaped to conform to the end of the cam 14 which engages therewith. Shaft 13 is extended at each side of the truck body and journaled in plates or brackets 18 extending from the truck body and secured thereto. A pin 19 may be passed through each end of shaft 13 to receive a suitable wrench for rotating the shaft.

A bracket 20 provided with an upper bearing 21 and a lower bearing 22 is secured to each end of end member 2 and an angle member 23 by any suitable means such as bolts 24, the angle member being secured to the lower flanges 25 of side members 1 of the chassis. A shaft 26 is journaled in bearings 22 and bearings 27 secured to the ends of angle member 23. A gear wheel 28 fixed to shaft 26 drives a larger gear wheel 29 fixed to a shaft 30 journaled in bearings 21. A third gear wheel 31 fixed to shaft 30 is arranged in mesh with teeth 32 formed on the under side of the lower flange 33 of a channel member 34, channel member 34 being secured in any suitable way to side member 3 of the truck body and arranged as shown in Fig. 3.

A substantially triangular plate 35 is loosely mounted on shaft 30 between gear wheels 29 and 31 and carries rollers 36 which extend into channel member 34 for engagement with the flanges thereof for the purpose hereinafter explained. A pin 37 may be passed through each end of shaft 26 to receive a wrench for turning the shaft. A similar channel-shaped member such as 34 and set of gears such as 28, 29 and 31 and a similar plate 35 with rollers 36 are arranged in like manner and for the same purpose at the opposite side of the truck body.

The lower flanges 33 of channel members 34 extend upwardly at an angle at the rear ends thereof, as shown in Fig. 2, so that when the truck body is in its normal position on the chassis and side members 3 rest upon side members 1, gear wheels 31 will be in full mesh with the teeth 38 arranged at an angle to teeth 32. Upon rotation of gear wheels 31, the rear end of the truck body will thereby be lifted from the chassis and moved backwardly with respect thereto. When the truck body has been moved backwardly a sufficient amount to bring teeth 32 into mesh with gear wheels 31, the rear end of the truck body will have been lifted from the chassis frame the same amount as the front end.

In dumping a load, shaft 13 is rotated to engage cams 14 with arms 6 to lift the front end of the truck body from the chassis so that this end is supported on rollers 10 in the manner explained above. Shaft 26 is then turned to cause gears 31 to rotate and lift the rear end of the truck body from the chassis and to carry the truck body backwardly, upper flanges 12 of side members 1 providing a suitable track for rollers 10. When the center of gravity of the truck body and its load passes beyond shaft 30, the body will tilt as shown in Fig. 1, and the load 39 dumped therefrom. When the body tilts, the flanges of channel members 34 will engage rollers 36 and tilt plate 35 a like amount about shaft 30. Engagement of rollers 36 with the flanges of channel members 34 holds the truck body in operative engagement with the chassis of the vehicle in dumping the load.

Various changes of structure and arrangement of the parts may be adopted without departing from the spirit of the invention or the scope of the claims.

The invention claimed is:

1. A truck body comprising a frame, and means carried by one end of said body frame and arranged to cooperate with the frame of a vehicle chassis to raise said body frame from the chassis and to move the same backwardly with respect thereto, said means comprising a member provided with teeth and permanently fixed to said body in all adjustments of the body frame relative to the chassis frame, gearing cooperable with the said toothed member, and a roller supported at the other end of said body frame for vertical shifting movement with respect thereto.

2. A truck body comprising a frame, and means carried by said body frame and arranged to cooperate with the frame of a vehicle chassis to raise said body frame from the chassis and move the same backwardly with respect thereto, said means comprising a member provided with teeth, said member being secured at one end of said body, a roller supported at the other end of said body frame for movement with respect thereto, and a cam carried by said body frame and adapted to effect movement of said roller to raise one end of said body frame.

3. A truck body comprising a frame, and means carried by said body frame and arranged to cooperate with the frame of a vehicle chassis to raise said body frame from the chassis frame and move the same backwardly with respect thereto, said means comprising a member secured to each side of said body frame at the rear end thereof, said members being provided with teeth, an arm pivotally supported at each side of said body frame at the front end thereof, and a roller carried by the free end of each of said arms, said rollers being arranged to engage said vehicle chassis frame upon pivotal movement of said arms to lift the front end of said body therefrom.

4. A truck body comprising a frame, and means carried by said body frame and arranged to cooperate with the frame of a vehicle chassis to raise said body frame from the chassis frame and move the same backwardly with respect thereto, said means comprising a member secured to each side of said body frame at the rear end thereof, said members being provided with teeth, an arm pivotally supported at each side of said body frame at the front end thereof, a roller carried by the free end of each of said arms, said rollers being arranged for engagement with said vehicle chassis frame to lift the front end of said body therefrom, and a cam carried by said body frame at each side of the front end thereof, said cams being adapted and arranged to effect movement of said arms to engage said rollers with said chassis frame.

5. The combination with the frame of a vehicle chassis, and a truck body frame connected for movement with respect to said chassis frame, of means adapted and arranged to lift one end of said body frame from said chassis frame and to move said body frame backwardly upon said chassis frame, said means comprising a member fixed to the body frame and extending substantially parallel thereto for the major portion of its length and provided with teeth, a portion of said member being disposed at an angle with respect thereto, and a gear wheel arranged in mesh with said teeth, said gear wheel being in full mesh with the teeth of said portion when said body frame is in engagement with and is supported by said chassis frame, said member and said gear wheel being arranged for cooperation with each other to lift one end of said body frame from said chassis frame when said gear wheel is rotated out of mesh with the teeth of said portion.

6. The combination with a vehicle chassis and a body frame supported thereby for movement with respect to the same, of a roller movably carried by said frame and arranged to permit one end of the latter to rest on said chassis and to lift said end only free of said chassis upon movement of said roller with respect to said frame, said roller upon said movement thereof engaging said chassis and providing means for facilitating movement of said frame with respect to said chassis, means for effecting said movement of said roller and holding the same in operative position, and means for slightly lifting the other end of the frame and sliding the frame longitudinally.

In witness whereof I hereto affix my signature.

VANTYLE W. CODDINGTON.